United States Patent
Gottschalk et al.

(10) Patent No.: US 6,675,844 B2
(45) Date of Patent: Jan. 13, 2004

(54) METHOD OF LOADING MOIST, STICKY BULK MATERIAL INTO A FLUID PERVIOUS CONTAINER

(75) Inventors: Lutz Gottschalk, Uster (CH); Georg Ronge, Düsseldorf (DE); Johannes-Peter Schäfer, Kürten (DE); Dirk Müller, Bergisch Gladbach (DE); Michael Prein, Brasschaat (BE); Werner Verhoeven, Kalmthout (BE); Domien Sluyts, Stabroek (BE)

(73) Assignee: Bayer Aktiengesellschaft, Leverkusen (DE)

( * ) Notice: Subject to any disclaimer, the term of this patent is extended or adjusted under 35 U.S.C. 154(b) by 12 days.

(21) Appl. No.: 10/135,550

(22) Filed: Apr. 30, 2002

(65) Prior Publication Data

US 2003/0017934 A1 Jan. 23, 2003

(30) Foreign Application Priority Data

May 16, 2001 (DE) .......................... 101 23 885

(51) Int. Cl.$^7$ ................................. B65B 1/04

(52) U.S. Cl. .............................. 141/324; 141/1; 141/10; 141/325; 383/102

(58) Field of Search ........................ 141/1, 7, 10, 59, 141/324, 325; 383/102

(56) References Cited

U.S. PATENT DOCUMENTS 6,199,602 B1 * 3/2001 Maginot et al. .............. 141/59

* cited by examiner

Primary Examiner—Gregory Huson
Assistant Examiner—Peter deVore
(74) Attorney, Agent, or Firm—Norris McLaughlin & Marcus

(57) ABSTRACT

Method of dispensing moist, sticky or statically charged bulk material into a fluid pervious container having an opening for receiving said bulk material, which comprises conveying a bulk material, as a suspension or dispersion in a fluid, from a reservoir, and introducing said suspension or dispersion into the fluid-pervious container through said opening in the container to pass the fluid component of the suspension or dispersion through and out of the fluid-pervious container while the retaining the bulk material within the container, and recirculating the fluid to the reservoir.

8 Claims, 1 Drawing Sheet

METHOD OF LOADING MOIST, STICKY BULK MATERIAL INTO A FLUID PERVIOUS CONTAINER

The invention relates to a method of loading moist, sticky or statically charged bulk material, in particular catalyst material, into fluid pervious containers.

BACKGROUND OF THE INVENTION

The published specifications DE 197 01 045 A1 and EP 0 640 385 A1 (=U.S. Pat. No. 5,536,699) disclose catalyst packaging which is provided with closable bags into which catalyst material can be introduced as bulk material and which are reusable to at least some extent when the catalyst is replaced. The filling of the catalyst bags or the replacement of the catalyst in the bags, in particular the filling of the catalyst bags, is in practice time-consuming and associated with further problems, since the catalyst material is frequently moist, sticky or statically charged and therefore does not flow readily.

SUMMARY OF THE INVENTION

It is an object of the invention to provide a method which makes it possible for packaging or containers of the type mentioned to be readily and quickly filled with moist, sticky or statically charged bulk material.

This object is achieved by a method of loading moist, sticky or statically charged bulk material, in particular catalyst material, into fluid-pervious containers which have a multiplicity of fine openings, wherein the bulk material is conveyed from a reservoir as a suspension or dispersion in a fluid, preferably a liquid, particularly preferably in water, and is introduced into the container through an opening in the container and in that the fluid exits through a multiplicity of openings in the container while the bulk material is retained in the container; and the fluid is recirculated to the reservoir.

DETAILED DESCRIPTION

The containers are preferably configured as a series of individual compartments in strip form, and are preferably formed of a woven metal mesh.

The method is suitable for introducing solid, granular or gel-form, catalytically, biologically or adsorptively active materials of various particle sizes, as finely divided particles suspended or dispersed in a fluid, into structured fluid-pervious containers which can serve dual functions. The first of said dual functions is to provide a very high contact area between two or more phases, for mass transfer between them. The structured fluid-pervious containers comprise closed fluid-pervious compartments comprised of a woven mesh or fabric, or of a membrane which is permeable to at least one fluid present in the process in which the loaded containers are to be used. The solid material which, as a second function, is active in the process in which it is used is present in the compartments and remains in the compartments after the compartments are closed, subsequent to being filled with the solid material. It is possible to vary the volume and number of the compartments in the containers, as well as the degree of fill of the container compartments in accordance with the requirements of the process in which they are used and the characteristics of the active solid material.

It can be a substantial advantage in various physicochemical processes for chemical, biological or other materials conversion processes to be superimposed on physical mass transfer processes, e.g. rectification or absorption, and vice versa. It is necessary to provide, on the one hand, a contact area sufficient for mass transfer between the fluid phases and, on the other hand, a very large active surface to achieve the dual functionality, with both functions, viz. mass transfer and materials conversion, having to be able to be varied to a wide degree in accordance with process requirements.

In such a context, catalytically active mass transfer packing is used for particular applications, e.g. heterogeneously catalyzed chemical reactions in the liquid phase, and is described, inter alia, in the patent specifications DE 197 01 045 A1, EP 0 631 813 A1, WO 98/58721 and WO 97/24174.

A significant disadvantage of the known apparatuses for simultaneously carrying out mass transfer and materials conversion is the comparatively great effort required to introduce the catalytically or biologically or absorptively active materials into the containers to be used, which sometimes have a complicated geometry. In particular, filling of the containers with such materials can be difficult or problematical from the point of view of occupational hygiene when the materials are not-free-flowing, or are sticky or dust-forming or gas-releasing or statically charged solids or granular materials or gel-form solids. In the hitherto customary procedure for filling the container compartments in structured packing having dual functionality, a basic prerequisite is for the material to be introduced to flow more or less well. In the filling procedure, the material which is catalytically active, biologically active or otherwise active is first conveyed manually or mechanically via a funnel or a similar device through a filling orifice of the chambers into the latter and is then distributed as uniformly as possible in the chamber by means of, for example, a shaking motion.

In the above-described prior art method, particularly in the case of granulated materials which have very poor flow, there are numerous difficulties, e.g. non-uniform distribution of the material in the chambers, voids or differing degrees of fill of the individual chambers, etc.

It is therefore an object of the present invention to provide a significantly simplified and practical method which offers significant advantages in respect of the abovementioned difficulties in filling the chambers. In addition, the time and effort required for filling the dual function elements should be significantly reduced. This object is achieved by the method of the invention.

In particular, the method of the invention for introducing solid, granular, catalytically, biologically or adsorptively active materials into structured multipurpose packing with dual function elements involves introducing the active material in the form of finely divided solid particles as a suspension or dispersion in a fluid into openings in the compartments of the container. The solid material is retained within the compartments, because the openings of the mesh forming the compartment walls are too small for the solid to pass through, but at the same time the mesh walls are permeable to the fluid, which therefore passes through the compartment walls and flows out. When the walls are formed of a membrane, the membrane allows the fluid, but not the solid material, to pass through. After the compartments are filled with the desired or predetermined amount of solid material, the openings through the materials were introduced are closed.

The present invention is therefore a method of loading moist, sticky or statically charged bulk material into a fluid pervious container having an opening for receiving said bulk material, which comprises conveying a bulk material, as a suspension or dispersion in a fluid, from a reservoir, and introducing said suspension or dispersion into the fluid-pervious container through said opening in the container to pass the fluid component of the suspension or dispersion through and out of the fluid-pervious container while retaining the bulk material within the container, and recirculating the fluid to the reservoir In one embodiment of the method, a flowable solid/liquid suspension or dispersion is produced in a fluidization vessel in a first step. The fluidization vessel is preferably a vessel or reactor which is provided with a stirrer as mixing element. Alternatively, the suspension or dispersion can also be produced merely by introduction of the fluid used for mixing or a second fluid into the fluidization vessel.

In this way, even granular materials which do not flow or flow only with difficulty, (e.g. ion-exchange resins which are moist with water or are impregnated with organic solvents) can be brought into a form which can be conveyed continuously. Furthermore, it is possible, for example, to avoid the formation of dusts during filling by the production of a suspension in a liquid, or to overcome difficulties in handling statically charged granular materials (e.g. oxidic catalysts which suffer from dust formation caused by abrasion when conveyed dry or ion-exchange resins which suffer from static charging in the water-free state).

Preference is given to a method in which an additive is added to the fluid containing the bulk material before introduction into the containers.

The additive is particularly preferably mixed in by a static or dynamic mixing unit.

As bulk material to which the method is applied, preference is given to a heterogeneous catalyst, in particular an ion-exchange resin, an oxidic catalyst or hydrogenation catalyst or an adsorbent or absorbent solid, in particular activated carbon or a support material with a biofilm.

As fluid, preference is given to an inorganic or organic solvent, particularly preferably methanol, ethanol, heptane or water.

In a particularly preferred embodiment of the method, the bulk material is an acidic or basic ion-exchange resin and the fluid used is water.

Preference is also given to an embodiment of the method which is characterized in that an additive which is a cocatalyst is added to the suspension or dispersion of fluid and bulk material.

Suitable fluids are, in particular, media which do not irreversibly change the physical, chemical, biological or other properties of the solid to be packaged or the total system which are desired for the intended use. Thus, preference is given to liquids or gases which are chemically inert towards the catalytically, biologically or absorptively active materials, or inactive in the intended use or in the production of the active materials, or are at least part of the working medium or of the use environment without exercising an undesirable influence in the operating state of the filled containers in intended use (e.g.: ion-exchange resins as active granular material and organic solvents such as methanol, ethanol or heptane as fluids). However, it is also possible to use fluids which can be removed completely from the system directly after filling of the containers or at the latest when operation of the process in which the loaded containers are used is started to such a degree that the desired operating state is not adversely affected, e.g. ion-exchange resins and water as fluid. A significant advantage of the novel method of introduction can thus rise from, for example, various intermediate steps in the production or conditioning of the active solid, for example separation from liquid or drying, becoming unnecessary or being able to be carried out more simply and more effectively in the packaged state in an industrial plant.

After the granular material has been brought into a continuously conveyable form in the fluidization vessel, the suspension or dispersion is transported, for example via a hose or pipe, to the containers to be filled. At the end of the hose or pipe there is, in particular, a nozzle which is flattened or has a shape corresponding to the requirements of the geometries of the container compartments to be filled, and allows clean introduction of the suspension or dispersion into the container compartments. The energy required for transport can be provided either by pumping or by application of a pressure gradient. A turbulence of the flow in the pipe or hose ensures that the solid remains finely suspended or dispersed in the fluid.

Furthermore, it is possible to integrate an additional mixing section into the filling apparatus so as to allow additives to be added to the active material. Such additives can, for example, be suitable for influencing the properties of the solid in a desired way. A very considerable advantage here is that the addition of the additive into a mixing section through which turbulent flow occurs enables very good distribution to be achieved. An example which may be mentioned is the coating of catalyst particles with a cocatalyst, in which case reliable, very uniform application is of great importance.

BRIEF DESCRIPTION OF THE DRAWINGS

The novel method is illustrated below by way of example with reference to the figures. In the figures.

EXAMPLE

Figure 1:
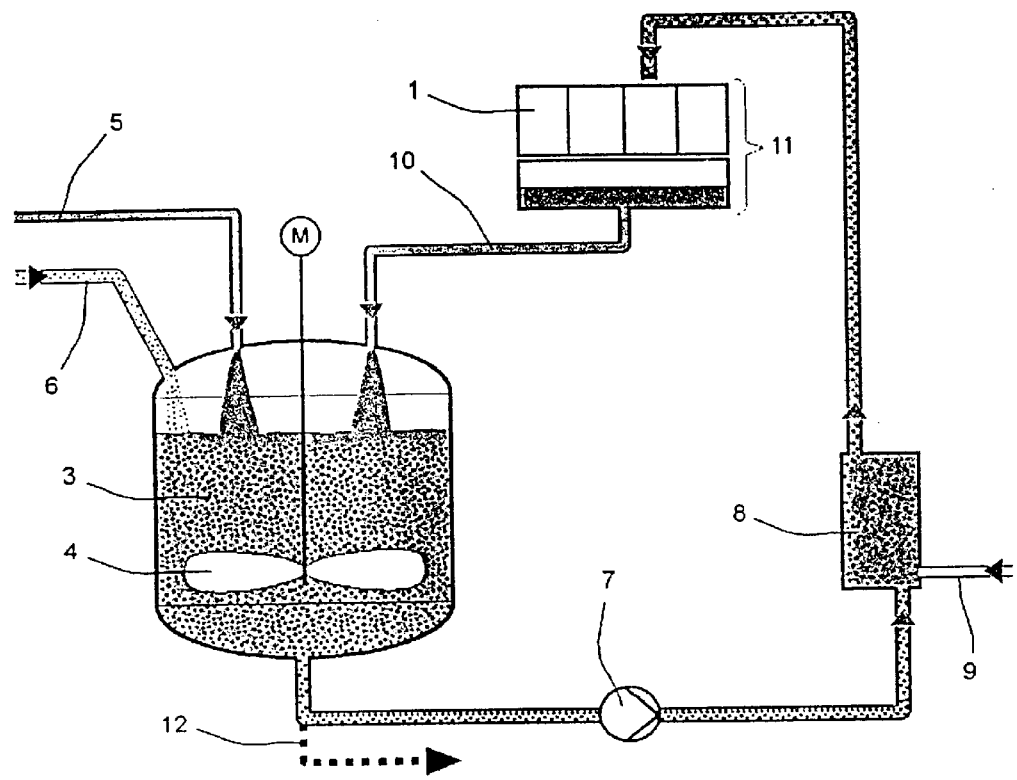
FIG. 1 schematically shows the overall apparatus for filling

FIG. 1 schematically shows the overall apparatus for filling the containers 1 having a plurality of compartments 2 in strip form of the structured multipurpose catalyst container. (The container corresponds to the packing known from DE 197 01 045 A1.) The apparatus comprises a fluidization vessel 3 including stirrer 4, the feedlines for the fluidization medium 5 and the solid 6 and also a pump 7 for the suspension or dispersion formed in the fluidization vessel, a mixing unit 8 for the introduction and mixing-in of additives, the feedline for additives 9 to the mixing unit and the return line 10 for fluidization medium from the filling position 11 to the fluidization vessel 3.

In the vessel 3, the catalyst 6 is mixed with water and dispersed by stirring. The pump 7 conveys the mixture through the mixing unit 8 to the filling position 11.

Figure 2:
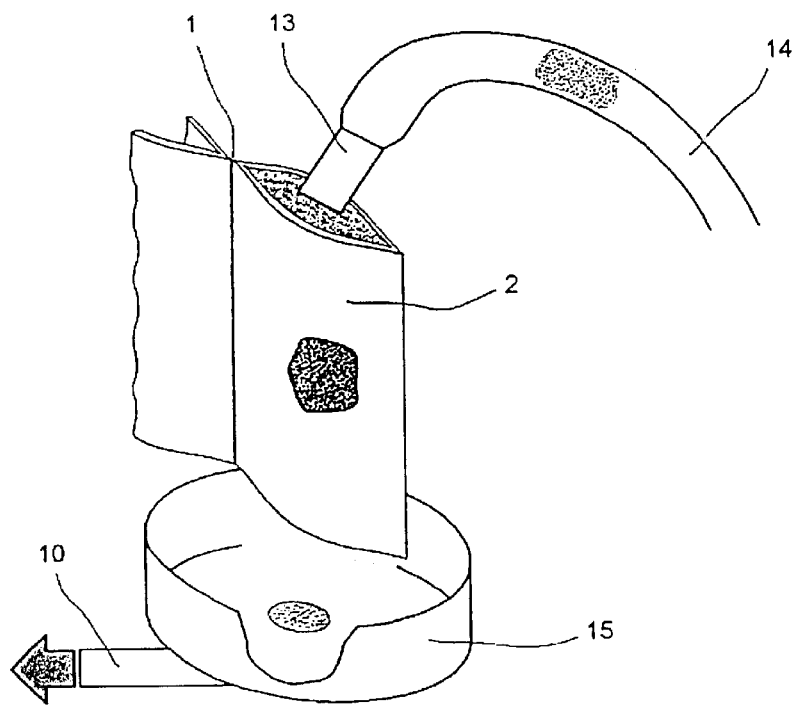
FIG. 2 shows a detail of the filling position (11).

FIG. 2 shows a detail of the filling position 11. The drawing shows the filling nozzle 13 with hose 14, the container 1 to be filled in strip form with compartments 2 open on one side and also a collection basin 15 located underneath for collecting the fluidization medium (water) which flows down, with return line 10 to the fluidization vessel 3. The catalyst is held back by the mesh of the chamber 2 and the water can flow back to the fluidization vessel 3.

We claim:

1. Method of loading moist, sticky or statically charged bulk material into a fluid pervious container having an opening for receiving said bulk material, which comprises conveying a bulk material, as a suspension or dispersion in a fluid, from a reservoir, and introducing said suspension or dispersion into the fluid-pervious container through said opening in the container to pass the fluid component of the suspension or dispersion through and out of the fluid-pervious container while retaining the bulk material within the container, and recirculating the fluid to the reservoir.

2. Method according to claim 1, wherein the containers are in strip form and are made of a woven metal mesh.

3. Method according to claim 1 wherein an additive is added to the fluid containing the bulk material before introduction into the containers.

4. Method according to claim 3, wherein the additive is mixed in by a static or dynamic mixing unit.

5. Method according to claim 1 wherein the bulk material is a heterogeneous catalyst, an adsorbent or absorbent solid, or a support material with a biofilm thereon.

6. Method according to claim 1 wherein said fluid is an inorganic or organic solvent.

7. Method according to claim 1 wherein said bulk material is an acidic or basic ion-exchange resin and said fluid is water.

8. Method according to claim 1 wherein a cocatalyst is added to the suspension or dispersion.

* * * * *